United States Patent

Holstein et al.

[11] 3,897,715
[45] Aug. 5, 1975

[54] VERTICAL BROACHING MACHINE

[75] Inventors: Herbert Holstein; Gustav Esser, both of Solingen, Germany

[73] Assignee: Oswald Forst Maschinenfabrik und Apparatebauanstalt GmbH, Solingen, Germany

[22] Filed: Aug. 26, 1974

[21] Appl. No.: 500,356

[30] Foreign Application Priority Data
Jan. 4, 1974   Germany........................... 2400235

[52] U.S. Cl. ............................ 90/71; 90/73; 90/91
[51] Int. Cl.² .................. B23D 41/06; B23D 41/04
[58] Field of Search .............. 90/79, 80, 71, 73, 77, 90/83, 84, 85, 63

[56] References Cited
UNITED STATES PATENTS

| | | | |
|---|---|---|---|
| 1,318,485 | 10/1919 | Donaldson | 90/73 |
| 2,571,904 | 10/1951 | Lofgren | 90/73 |
| 3,550,504 | 12/1970 | Fulks | 90/63 |
| 3,799,030 | 3/1974 | Schubert | 90/73 |

Primary Examiner—J. M. Meister
Assistant Examiner—W. R. Briggs
Attorney, Agent, or Firm—Browdy and Neimark

[57] ABSTRACT

The invention concerns a vertical broaching machine, especially an internal broaching machine, with at least one workpiece holder mounted on a machining table, with a broaching slide mounted beneath the machining table, said slide vertically displaceable, pulling at least one broaching tool through the workpiece or workpieces, having a broach feed channel mounted above the workpiece holder and vertically displaceable, with a feed means for elevating the workpieces in front of the workpiece holder and with a delivery means for transporting the workpieces from their position in front of the workpiece holder to their broaching position on the workpiece holder.

3 Claims, 5 Drawing Figures

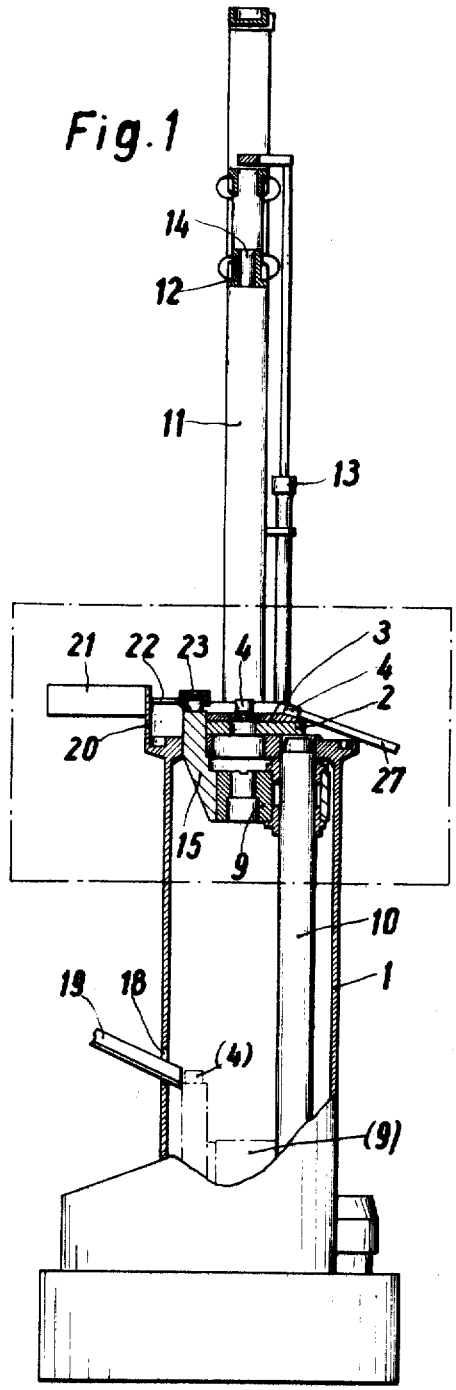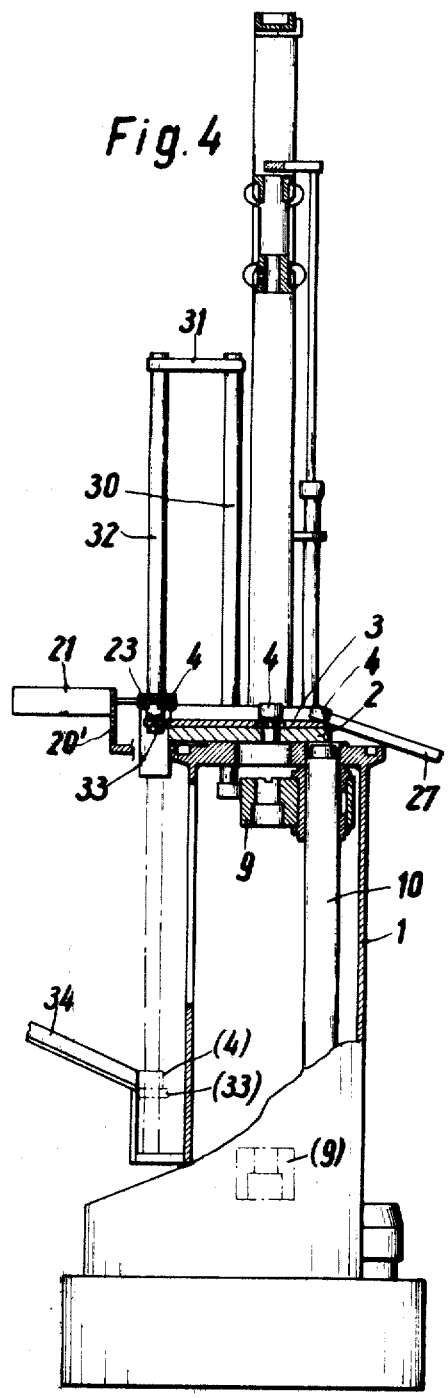

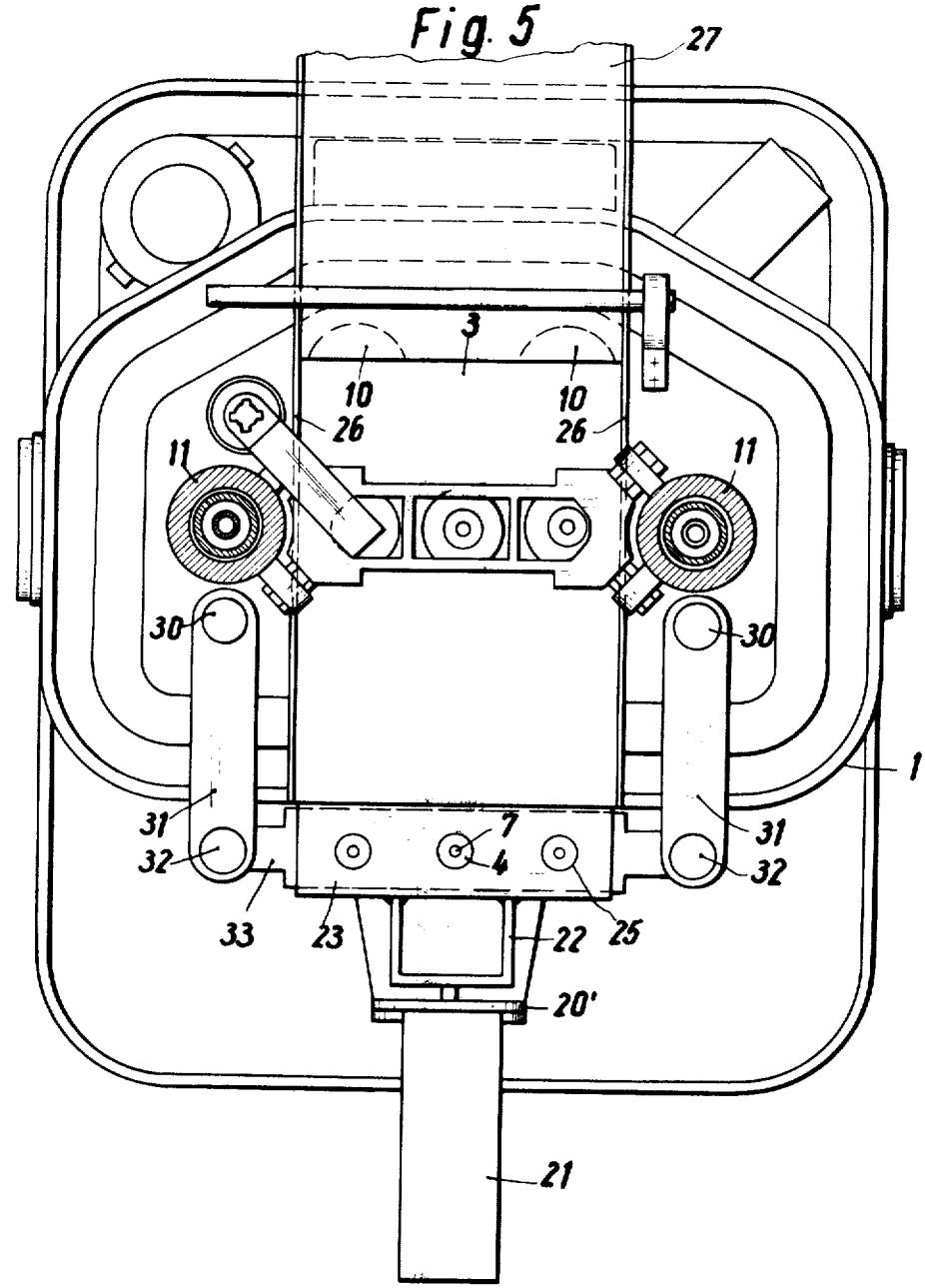

_3,897,715_

VERTICAL BROACHING MACHINE

BACKGROUND OF THE INVENTION

In known vertical broaching machines, an inclined conveyor is provided in front of the machine frame for elevating the workpieces from the floor to a position above the workpiece holder. From this position they are guided via feed channels to the workpiece holders. Separating means must also be provided on these feed channels, through which the workpieces can be guided to the workpiece holder individually and in chronologically correct sequence relative to the machine cycle. Such feed means for elevating workpieces in front of the workpiece holder are extremely costly to construct.

It is also known to place the workpiece by hand in the broaching position on the workpiece holder and to remove them again by hand. For this purpose, the machine frame must either be considerably depressed in the floor, so that the workpiece holder is located at an operating height of approximately 3.5 ft. above the floor which serves as a base for the operator, or a platform must be provided for the operator. Aside from the fact that depressing the machine frame in the floor is very costly and is frequently impossible for structural reasons, extraordinary comprehensive safety measures must be taken in both cases in order to prevent any possible injury to the operator when operating the machine during broaching of workpieces.

SUMMARY OF THE INVENTION

The purpose of the invention is therefore to construct a vertical broaching machine of the type described hereinabove, such that elevation of the workpieces in front of the workpiece holders is possible without separate drive means.

This goal is accomplished in accordance with the invention by a support for the workpiece being provided operatively connected to the broaching slide, the side of the support which carries the workpiece being aligned in the upper end position of the broaching slide with the upper side of the workpiece holder. The characteristic of the invention therefore lies in the fact that the movement of a part of the vertical broaching machine for elevating the workpiece in front of the workpiece holder, which occurs in any case, is utilized. The construction costs required for this are extremely low; on the other hand operator safety precautions become practically unnecessary.

In an advantageous embodiment of the invention, the support is made in the form of a bracket which is mounted on the broaching slide, projects up from the latter and can be moved within the machine frame. The elevation of the workpieces in front of the workpiece holder is therefore carried out within the machine frame, which is completely enclosed as a rule, so that no additional safety measures are required. Furthermore, it is necessary merely to attach a simple bracket on the broaching slide and provide a corresponding recess in the machining table, through which the bracket carrying the workpieces can move in front of the workpiece holder.

In another likewise advantageous embodiment of the invention, the holder is mounted in front of the machine frame and connected to the broaching slide by pull rods. In the latter version, a protective cage must be mounted on the front side of the machine frame, through which the support moves upward. This arrangement is especially advantageous in the case of very large workpieces, wherein the recesses in the machine table that are required in the first embodiment would lead to excessive weakening of the machine frame.

BRIEF DESCRIPTION OF THE DRAWING

Further advantages and features of the invention follow from the description of the sample embodiments with reference to the drawings.

FIG. 1 shows a vertical internal broaching machine of the present invention in a side view, partially cut away, with a feed device mounted on the broaching slide for elevating the workpieces in front of the workpiece holder.

FIG. 4 is a second embodiment of the vertical internal broaching machine of the present invention with a modified feed device for the workpieces, and FIG. 5 is a top view of the machining table of the machine according to FIG. 4.

DETAILED DESCRIPTION OF THE INVENTION

Figure 2:
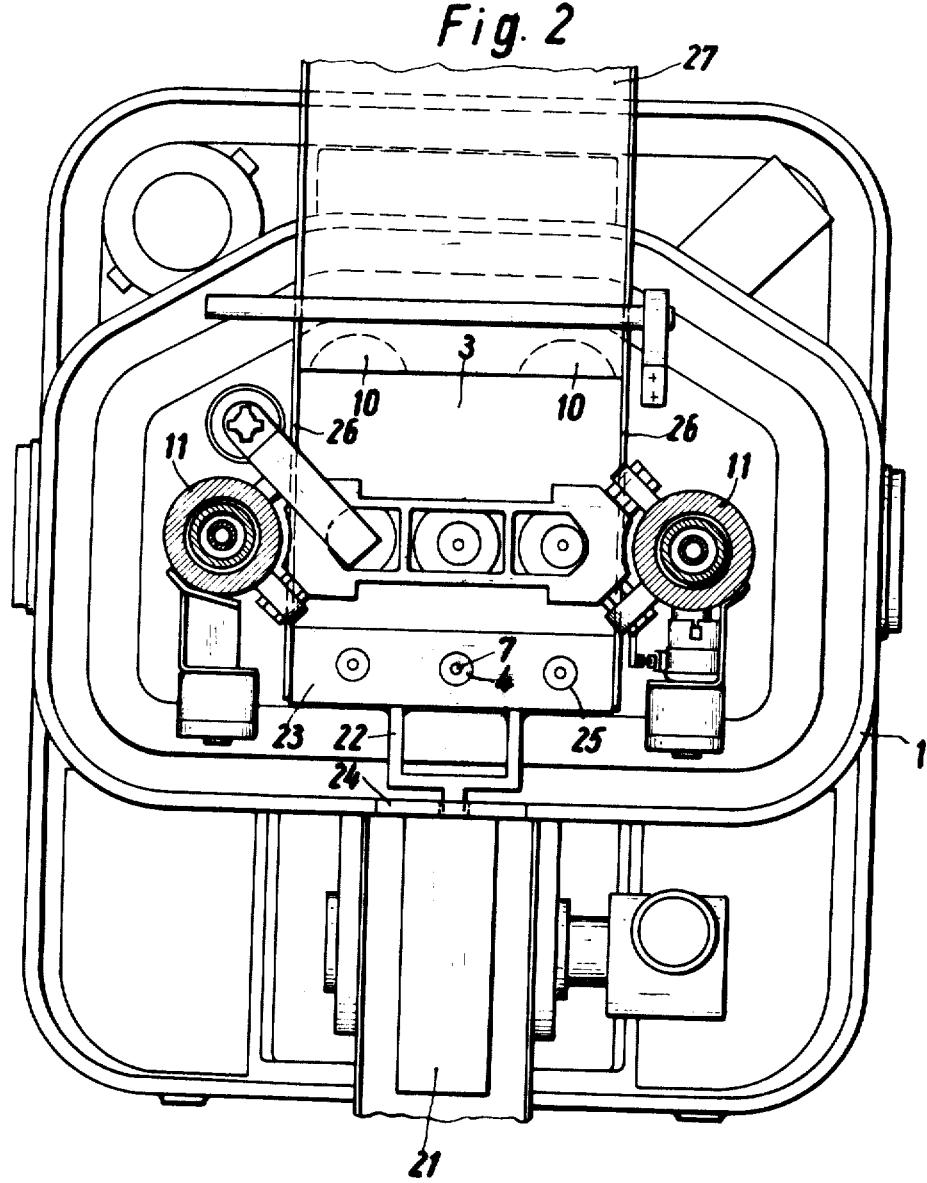
FIG. 2 is a top view of the machining table of the machine according to FIG. 1.

A machine frame 1, constructed in the usual fashion, i.e., approximately block-shaped, has mounted on it a horizontally arranged machining table 2, which is also referred to as an adapter plate. Three workpiece holders 3 are mounted on machine table 2, which serve to accept and support workpieces 4 to be broached. Since in the present case it is an internal broaching machine which is under discussion, two mutually aligned holes 5 and 6 are provided in workpiece holders 3 and in machining table 2, so that a broaching tool (not shown) can be pulled downward through a corresponding hole 7 aligned with the two holes 5 and 6 in each workpiece 4. In addition, after broaching the workpiece 4, the broaching tool is held by its shank head in a shank holder (likewise not shown), which is mounted in corresponding hole 8 on a broaching slide 9 which is arranged below machining table 2 and is vertically displaceable in machine frame 1. The broaching slide 9 is guided on two guide columns 10. The broaching slide 9 is also driven by vertically mounted hydraulic main drive cylinders 11 which are located in the vertical plane spanned by the middle axis of the broaching tool.

A tool feed channel 12 is mounted above the machining table 2, and is also vertically displaceable in a plane spanned by the broaching tool and the main drive cylinder 11 by means of a hydraulic actuating cylinder 13. The tool feed channel 12 is guided laterally on the outside surfaces of main drive cylinder 11. At its lower end it has an endpiece holder (likewise not shown) for each broaching tool, said endpiece holder being appropriately mounted in a corresponding hole 14. In such an endpiece holder, the upper endpiece head of a broaching tool is held during the downwardly directed broaching procedure and the later elevation of the broaching tool.

The broaching machine described hereinabove is known and operates in known fashion, i.e., the broaching tools held in the shank holders of broaching slide 9 are pulled by a downward movement of broaching slide 9 through holes 7 in workpieces 4 and thus broach hole 7 to the desired shape. After termination of the broaching procedure, the broaching tools are released from the endpiece holders and are pulled all the way down through the workpieces. The workpieces 4 (in a manner described in greater detail hereinbelow) are removed from the workpiece holders 3. The broaching slides 9, with the broaching tools, are then elevated again until the upper endpieces of the broaching tools are again grasped by the endpiece holders on workpiece feed channel 12. The shank heads of the broaching tools are then released by the shank holders in broaching slide 9 and, then the broaching tool feed channel 12 together with the broaching tools is elevated until the lower shank of the broaching tools are definitely above the workpiece holders 3, i.e., above the feed channel for new workpieces 4, so that the workpiece shanks are released beforehand from the shank holders on the broaching slide 9. Following the feed of new workpieces 4 to workpiece holders 3, the broaching tools are guided from above through workpiece 4 and holes 5 and 6 and grasped again by the shank holders in broaching slide 9. Then a new broaching process begins.

A bracket 15 projecting upward above broaching slide 9 is provided as a feed device for elevating workpieces 4 from below up to the level of the upper side of workpiece holder 3 on the front side of broaching slide 9, forming a rest for the workpieces. This bracket extends sufficiently far upward so that its upper side is aligned, when broaching slide 9 has traveled to its upper end position, with the upper side of workpiece holder 3. The upwardly extending part 16 of bracket 15 moves to its upper end position when broaching slide 9 moves to its upper position through appropriate recess 17 in the machining table.

In the lower region of machine frame 1, enclosed on all sides, and precisely at the level at which the upper side of portion 16 of bracket 15 is located, when broaching slide 9 has traveled to its lower end position, an opening 18 is provided in the front side of machine frame 1, through which workpiece 4 to be broached can be placed upon the upper side of portion 16 of bracket 15. The broaching slide is shown dashed in the lower position in FIG. 1. To guide the workpieces into the upper surface position 6 when bracket 15 is in the lower position, a known feed channel 19 can be provided. Alternatively, the workpieces can also be placed by hand upon the portion 16 of bracket 15, when it is necessary to close opening 18 with a flap (not shown) which is connected to a safety switch in such fashion that broaching slide 9 together with bracket 15 and workpieces 4 resting upon the latter can be elevated only when the flap has been closed again, in order to prevent injury to the hands of the operator.

At the level of workpiece holder 3 is located a horizontally mounted hydraulic actuating cylinder 21 on a projecting support 20, on whose piston rod 22 a mask 23 is mounted, the mask 23 serving as a feed slider. In the withdrawn position of piston rod 22, this mask 23 is located with its recesses 24, adjusted approximately to the form of workpiece 4, opening downward, on the feed channel of workpiece 4 on the portion 16 of bracket 15, so that the workpieces 4 located on the portion 16 of the bracket 15 are moved when broaching slide 9 is in its upper end position into these recesses. Then mask 23 is displaced to the right by operation of hydraulic actuating cylinder 21 (in FIG. 1) so that the workpieces come to their broaching position on workpiece holder 3. In order to allow the broaching tools to be guided from above through the mask, the mask is provided with appropriate holes 25 on its upper side.

Following completion of the broaching procedure described above, in other words, when the broaching tools have been passed completely down through workpieces 4, the workpieces are pushed in the direction of the back of the machine frame 1 in a second ejection step of horizontal actuating hydraulic cylinder 21, from which position they slide out freely via an ejection chute 27. The masks are then drawn back into their initial position along the slide channel of bracket 15. If mask 23 is simply made in the form of a slider, it is advantageous if lateral guide slots 26 are provided for lateral guidance of workpieces 4 on plate-shaped workpiece support 3.

Figure 3:
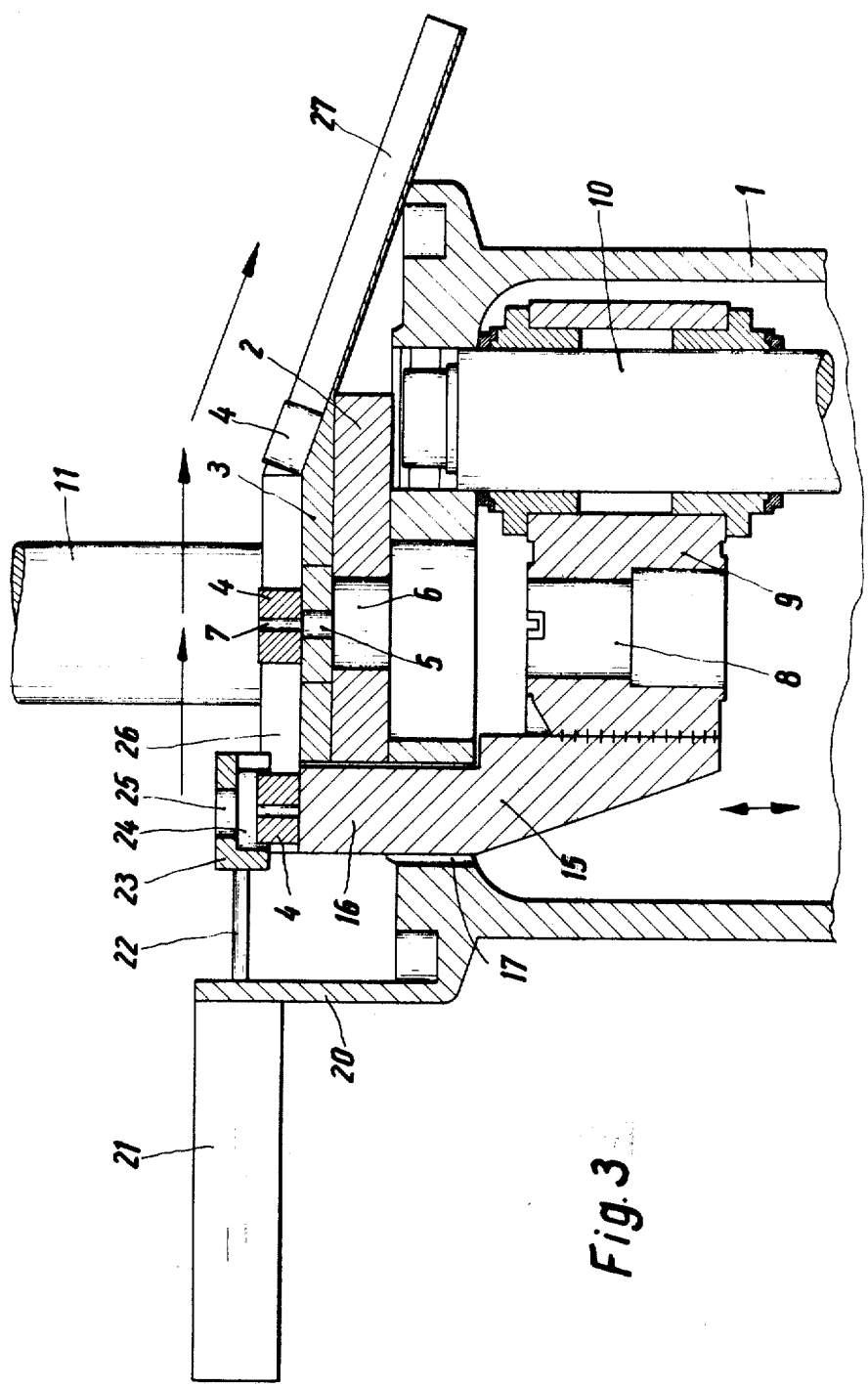
FIG. 3 is an enlarged section of FIG. 1.

The further embodiment shown in FIGS. 4 and 5, with respect to the embodiment of the vertical internal broaching machine without the feed device (portion 16 and bracket 15 on broach slide 9) for elevating the workpiece to the mask 23 corresponds completely with the embodiment in FIGS. 1 to 3, so that in this respect reference may be made to corresponding parts of the specification. In this further embodiment machining table 2 and platform-shaped workpiece holder 3 are flush with the front endge of machine frame 1.

In the two external areas of the front side of broaching slide 9, two rods 30 are provided, extending vertically upward, such that the upper ends of rods 30 will still be located above the workpiece support 3 when the broaching slide 9 is in its lowest end position.

By means of a projecting traverse arm 31 mounted on the upper ends of rods 30, pull rods 32 are mounted parallel to rods 30. Pull rods 32 are also likewise vertically arranged. At the lower ends of pull rods 32, a support plate 33 is mounted on which workpieces 4 can be supported. Rod 30 and pull rods 32 are dimensioned in such fashion that in the upper end position of broaching slide 9 the upper side of support plate 33 is aligned with the upper side of workpiece support 3 and its rear side abuts the front side of workpiece support 3. Pull rods 32, together with support plate 33 mounted on their lower ends, are free to move toward and away from the front side of machine frame 1.

In the lower position of broaching slide 9, also shown in dashed form, in FIG. 4, support plate 33 is also in a lower position, in which workpiece 4 can be conveniently placed on support plate 33 by an operator. Alternatively, this can be accomplished automatically by means of a feed channel 34. At the level of workpiece support 3, by means of a counterbearing 20' mounted on machine frame 1, another horizontal hydraulic actuating cylinder 21 is mounted with a recess 23 for receiving the workpieces. The operation of this horizontal actuating cylinder to place the workpieces 4 in a position on workpiece holder 3 to be broached is substantially as described hereinabove.

It is to be understood that the invention is not limited to the embodiments disclosed which are illustratively offered and that modifications may be made without departing from the invention.

What is claimed is:

1. In a vertical broaching machine mounted in a frame and including at least one workpiece support mounted on a machining table;

a vertically displaceable broaching slide means mounted below the machining table, for pulling at least one broaching tool through at least one workpiece;

a vertically displaceable broaching tool feed channel located above said workpiece support;

the improvement comprising:

feeding means for elevating workpieces in front of said workpiece support, said feeding means comprising a vertically displaceable plate, with an upper surface, connected to the broaching slide, said upper surface being aligned with said workpiece support when the broaching slide is vertically displaced to the upward extent of its travel, and transporting means for receiving said at least one workpiece from said feeding means and transporting it to said workpiece support for broaching.

2. The broaching machine of claim 1, wherein said vertically displaceable plate comprises a bracket mounted on the broaching slide and moveable with the broaching slide internal to the frame of the broaching machine.

3. The broaching machine of claim 1, wherein said vertically displaceable plate comprises a workpiece carrying plate external to the frame of the broaching machine and rigidly connected to the broaching slide.

* * * * *